United States Patent [19]

Shelton

[11] 4,327,761

[45] May 4, 1982

[54] THERMOSTATIC SELF-POWERED DRAIN VALVE

[76] Inventor: Russell S. Shelton, 9 Park Ave., Flanders, N.J. 07836

[21] Appl. No.: 175,123

[22] Filed: Aug. 4, 1980

[51] Int. Cl.$^3$ .......................... E03B 7/12; F16L 55/00
[52] U.S. Cl. ...................................... 137/62; 137/79; 138/32; 237/80
[58] Field of Search ...................... 137/59, 62, 79, 61, 137/301, 302; 138/32, 35; 126/420; 237/80; 251/43, 44

[56] References Cited

U.S. PATENT DOCUMENTS

| 1,306,186 | 6/1919 | Kidder | 137/62 |
| 2,118,299 | 5/1938 | Ellis | 137/79 |
| 2,301,318 | 11/1942 | Peo | 137/79 X |
| 2,777,303 | 1/1957 | Slattery | 137/62 |
| 3,320,965 | 5/1967 | Morgan | 137/62 |

FOREIGN PATENT DOCUMENTS

| 2462265 | 8/1976 | Fed. Rep. of Germany | 137/79 |
| 581772 | 12/1924 | France | 137/62 |

Primary Examiner—George L. Walton

[57] ABSTRACT

A water or other hydraulic system is protected by a thermostatic drain valve having a bimetal disc arranged with a three port cavity and a specially designed and compliantly sealed valve core so that the spring action of the disc acting together with the pressure of the fluid in the system constitutes the only power required to operate the valve.

5 Claims, 3 Drawing Figures

THERMOSTATIC SELF-POWERED DRAIN VALVE

RELATED APPLICATION

A similar thermostatically controlled valve is disclosed in applicant's copending application, Ser. No. 924,848, filed July 14, 1979, now U.S. Pat. No. 4,243,062.

BACKGROUND OF THE INVENTION

The prior art has recognized the need for thermostatically controlled hydraulic drain valves for draining water systems in buildings and equipment to prevent breakage during freezing. These drain valves were generally powered by spring-trip mechanisms or expandable bellows mechanisms. The usefullness of bimetallic elements in thermostatics has been recognized, typically requiring a source of electrical power to couple the thermostatic to a separately powered valve. Only the crudest efforts have been made to power the valve directly by the action of the bimetallic element.

SUMMARY OF THE INVENTION

In accordance with the present invention, unique advantage is taken of a bimetallic disc. These discs have the property of snapping sharply and from one configuration to another at a temperature critically determined by the construction of the disc. The invention provides a structure particularly adapted to contain such a disc, and by use of the mechanical advantage provided by a uniquely designed and compliantly sealed piston or valve core, to power the valve directly by the state change of the disc.

As thus conceived the invention takes advantage of the known fact that flowing water does not easily freeze. When temperature drops below a predetermined temperature slightly above freezing, the control opens the valve. A trickle of water starts flowing from the system to a waste line, or preferably, through a drain system of the fixture being protected. This provides an added advantage of simultaneous protection of the drain. The structure is inexpensive to manufacture and so simple to install that installation is within the capability of a homeowner without resorting to professional help.

DETAILED DESCRIPTION OF THE PREFERRED EMBODIMENT

Figure 1:
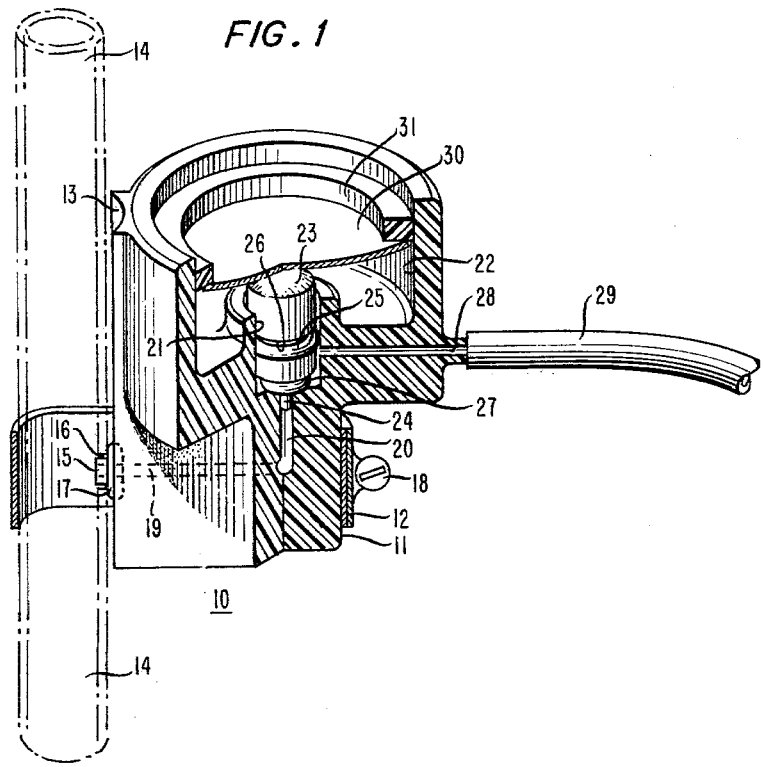
FIG. 1 is a cutaway cross-sectional view of the thermostatic valve in accordance with the invention.

Referring more particularly to FIG. 1, the thermostatic valve in accordance with the invention comprises a body 10, cast or machined of metal or injection molded of plastic. Body 10 is suitably shaped to provide a shoulder 11 over which a clamp 12 is fitted to align and rigidly secure an opposite face 13 of body 10 to pipe 14. Pipe 14 is merely illustrative of the water system to be protected. Face 13 is slightly shaped to accomodate the circumference of pipe 14 and boss or protuberance 15, formed on face 13, extends into pipe 14 through a small hole 16 drilled in pipe 14. A "O" ring gasket 17 received over protuberance 15 seals face 13 of body 10 to pipe 14 around hole 16 when clamp 12 is tightened by suitable means such as screw 18.

Body 10 is further formed with a port or bore 19 extending through the center of protuberance 15 into a center region of body 10 to intersect a continuing port or bore 20, preferably at right angles to bore 19. The right angle relationship is preferred to allow shoulder 11 to be located in its best alignment for engagement by clamp 12. Bore 20 opens into a cylindrical cavity 21 of substantially larger diameter than bore 20. A cylindrical cup 22, open at the top and axially aligned with and of substantially larger diameter than cavity 21 is formed in body 10 above cavity 21 and forms a second port opening into cavity 21.

Vertically received within cavity 21 is a cylindrical valve plunger or core 23 formed with a cylindrical protuberance 24 upon the lower end of core which enters bore 20. A first "O" ring 25, received in a small angular recess 26 in core 23, seals core 23 within cavity 21 but allows a sliding vertical movement of core 23 within cavity 21. A second "O" ring 27 received about protuberance 24 seals core 23 to the bottom of cavity 21 around the opening of bore 20.

Body 10 includes a third port or bore 28 which intersects cavity 21 between the locations of "O" rings 25 and 27. Thus, when core 23 is raised by the fluid pressure carried through bores 19 and 20 from pipe 14, the seal produced by "O" ring 27 is broken and bores 19 and 20 are coupled for free fluid flow to bore 28. A tube 29, the use of which will be hereinafter considered, is suitably connected to the outer end of bore 28.

The top of cup 22 is closed by a transversely extending bimetallic disc 30 which is urged to bear against the upper end of core 23 by a washer or lock nut in the form of a ring 31, held by friction or otherwise to the inner surface of cup 22.

Bimetal disc 30 is of construction, readily available on the market, having the property that at one temperature extreme the surface of the disc 30 is cupped spherically in one direction and at the opposite temperature extreme the surface curvature is the reverse. The temperature at which the surface curvature snaps from one configuration is a property of its bimetal construction.

In accordance with the invention, this property is utilized by mounting disc 30 so that its high temperature configuration is concaved downward as shown so that disc 30 restrains body 18 and particularly "O" ring 27, against the bottom of cavity 21, to seal about bore 20. Disc 30, however, is designed so that it snaps into a concave upward configuration at a temperature slightly above freezing. The snap action of disc 30 opens the coupling from bore 19 to bore 28 to its full extent as core 23 rises under pressure of the fluid from pipe 14.

Recognizing that the throw of disc 30 between its respective curvatures and the mechanical force that can be generated by this throw are both small, the design of the closure achieved by "O" ring 27 acting with protuberance 24 in accordance with the invention is critical. Further, recognizing that "O" ring 27 comprises a torus of compliant material having a torus diameter that defines the effective transverse cross section exposed to the pressure from pipe 14, the nature of this closure may now be examined. In particular, the transverse cross section of protuberance 24 and the torus diameter of ring 27 are both small with respect to the transverse cross section of core 23. When the valve is closed, the compliant torus is flattened and sealed against the bottom of cavity 23 and the vertical force of fluid pressure acting upon the effective cross section of the torus and protuberance 24 is small and easily reacted against by the spring action of disc 30.

As the critical temperature is approached, internal stresses in disc 30 begin to bias it toward a change in curvature. The hydraulic force assists the change. As core 23 moves slightly upward, the flattened nature of the torus is relieved and its effective transverse area is increased, increasing the upward force. Thus, the pressure range within which the valve functions can be increased by initially selecting a smaller torus diameter for "O" ring 27 or reduced by selecting a larger torus diameter. When the disc 30 finally snaps up, fluid seeps past ring 27 until pressure acts upon the total cross sectional area of core 23, completing the upward shift of core 23. The mechanical advantage thus defined enables the spring action of disc 30 acting with fluid pressure in the system to comprise the only power required to operate the valve.

While not illustrated as part of the preferred embodiment, it should be noted that core 23 may be mechanically secured to disc 30 as by a brad or other protuberance from core 23 extending through a small hole in disc 30. Thus, when disc 30 snaps it pulls core 23 with it.

To reset the valve, the design of ring 31 allows disc 30 to be warmed for a few seconds by a finger or a thumb to return disc 30 to its concave downward configuration. The valve will automatically close in the presence of warm water flowing into the valve.

The invention has application in the normally cold spots of a house or building such as basement piping near windows, unheated garage and utility rooms or bathrooms in extensions. Application can also be found in campsites and mobile homes.

Figure 2:
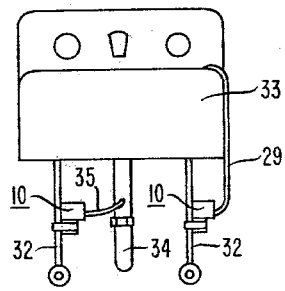
FIG. 2 is a schematic view of one application of the invention.

FIG. 2 illustrates a typical installation. A wall sink 33 having supply pipes 32 and trap-drain 34 is equipped with thermostatic valves 10 upon supply pipes 32. For temporary installation, tube 29 is extended into sink 33. For a more permanent installation, tube 35 is extended directly into trap 34. When freezing temperature is approached, valves 10 open allowing water to flow through trap 34 to provide simultaneous protection to both the supply pipes as well as the drain pipes.

Figure 3:
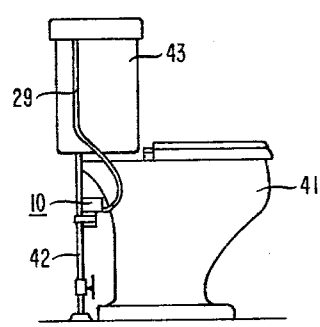
FIG. 3 is a schematic view of a second application of the invention.

Application to a typical toilet installation is shown in FIG. 3. Toilet 41 having supply pipe 42 and tank 43 is protected by valve 10 upon supply pipe 42. By extending tube 29 into tank 43 protection is provided simultaneously to the tank, the bowl and the drain system.

The structure in accordance with the present invention may serve as the thermostatically sensitive element in the system disclosed in my above mentioned copending application.

In all cases, it is understood that the above described arrangement is merely illustrative of one embodiment of the invention and that numerous modifications thereof will readily occur to one in the art.

I claim:

1. A thermally sensitive hydraulic valve comprising a body having a longitudinal cavity therein and three ports opening into said cavity, means for applying fluid pressure to one of said ports, a valve core slideably retained within said cavity and compliantly sealed to the walls of said cavity to form a piston therein, a protuberance extending from one end of said valve core, said protuberance aligned to extend into one of said ports and compliantly sealed thereto to close the coupling from said one port to a second of said ports, said protuberance having a transverse cross-sectional area that is small with respect to the transverse cross-sectional area of said piston so that said fluid pressure applied to said one port exerts a force upon the cross-section of said protuberance proportional to said small area, a bimetal disc having a normally concave surface extending transversely across the third port of said cavity and bearing upon the other end of said valve core to urge said protuberance into said one port, said bimetal disc adapted to become convex when the temperature thereof passes through a predetermined temperature thereby allowing an initial flow of fluid past the compliant seal of said protuberance and into contact with said piston so that said fluid pressure exerts a force upon the cross-section of said piston proportional to said large area to further increase said initial fluid flow.

2. The valve of claim 1 including a torus of compliant material surrounding said protuberance.

3. The valve of claim 2 wherein said torus has a cross-sectional area in the plane of its diameter that is small with respect to the cross-sectional areas of said piston.

4. The valve of claim 1 wherein said one port couples to a channel having two sections having with their respective axis thereof substantially at right angles to each other, and means for clamping the section remote from said protuberance to a water pipe with the axis of said remote section substantially at right angles to said water pipe.

5. A thermally sensitive hydraulic valve comprising a body having a longitudinal cavity therein and three ports opening into said cavity.

a valve core slideably retained within said cavity and compliantly sealed to the walls of said cavity to form a piston therein, a protuberance extending from one end of said valve core, said protuberance aligned to extend into a first of said ports and compliantly sealed thereto to close the coupling from said first port to a second of said ports, said protuberance having a transverse cross-sectional area that is small with respect to the transverse cross-sectional area of said piston, a bimetal disc having a normally concave surface extending transversely across the third port of said cavity and bearing upon the other end of said valve core to urge said protuberance into said first port, said bimetal disc adapted to become convex when the temperature thereof passes through a predetermined temperature thereby opening the compliant seal of said first port a first amount to allow a flow of fluid to said piston to open said first port a further amount.

* * * * *